UNITED STATES PATENT OFFICE.

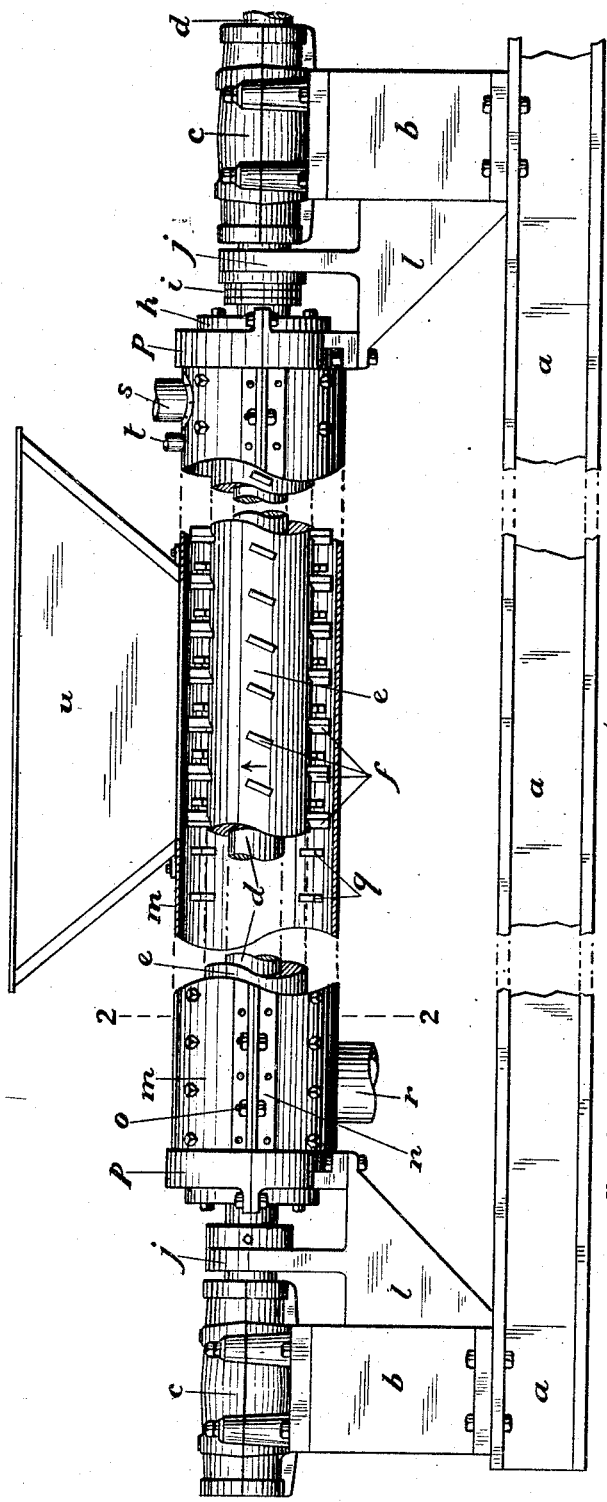
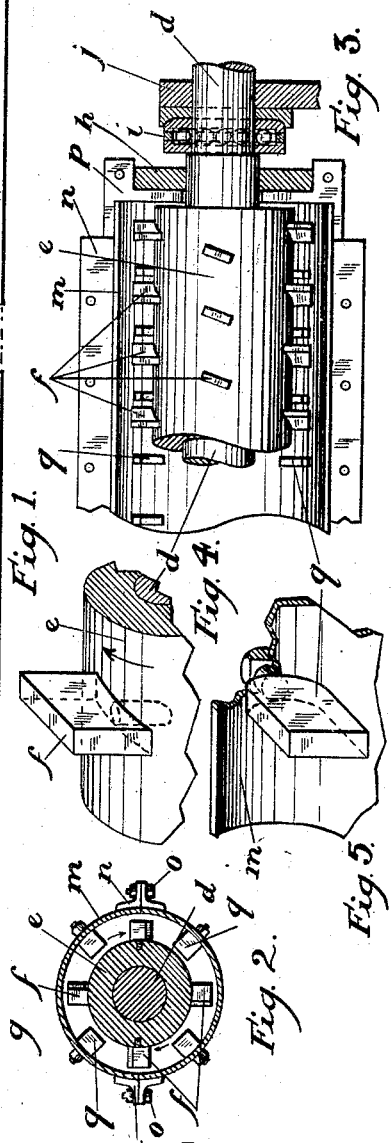

HENRY ALBERS, OF PORTLAND, OREGON.

SCOURING-MACHINE.

1,303,143.  Specification of Letters Patent.  Patented May 6, 1919.

Application filed December 7, 1917. Serial No. 206,109.

*To all whom it may concern:*

Be it known that I, HENRY ALBERS, a citizen of the United States, and a resident of the city of Portland, county of Multnomah, State of Oregon, have invented a certain new and useful Improvement in Scouring-Machines, of which the following is a specification.

My invention has for its object the providing of an efficient grain scouring machine, especially adapted for cleaning wheat, which shall accomplish its work through the rubbing or scouring action of grain kernels against each other; the device being arranged to cause the kernels to bear and grind with effective frictional force against each other.

In scouring machines which use an abrasive surface there is too much waste; all required in the cleaning of wheat being to take off the outer skin, or what is known as the outside fiber or fuzz of the grain.

I attain my object in a machine comprising an elongate cylindrical shell or housing in which revolves a longitudinally arranged, concentric shaft; the opposed faces of the shell and the shaft being provided with smooth-faced ribs adapted to impart a rotary and forward motion to the mass of grain contained in the housing, and so as to cause the forward movement of the mass to the expelling spout of the housing.

Where operating on hard grains, I also provide means for introducing water or steam into the housing, so as to soften the skin of the grain.

The construction and operation of my machine is hereinafter fully described, reference being had to the accompanying drawings, in which:

Figure 1 is a side elevation of my machine, with parts broken away and portions shown in section;

Fig. 2 is a cross section taken on the line 2—2 of Fig. 1, and illustrates the correlated position of the coöperating ribs provided on the opposed faces of the revolving cylinder and of the inclosing housing of my machine;

Fig. 3 is a larger-scale detail, in horizontal plane, showing the lower half of the inclosing case of my machine, a portion of the cylinder revolving therein, and further showing sectional details of the means for providing a ball-bearing end-thrust for the revolving cylinder;

Fig. 4 shows a detail of the ribs provided on the periphery of the revolving cylinder; and Fig. 5 is a detail of the ribs provided on the opposed inner face of the inclosing case.

*a* represents a frame provided with standards *b*, *b*, supporting journal boxes *c*, *c*, in which revolves a shaft *d*. On this shaft is mounted a cylinder *e*, or the latter may be an integral part of the shaft *d*. The cylinder is made elongated and is provided with a plurality of ribs *f*, arranged at an oblique angle to the axis of rotation of the cylinder *e*, or, in other words, are located in a plane extending spirally about said axis, as illustrated in Figs. 1, 3 and 4, so that with the rotation of the cylinder the ribs *f* will have a tendency to move the material with which they come into contact forward, in this respect resembling the action of the spiral auger in a conveyer. But the ribs *f* are spaced apart so as to break the spiral, as it were, in order that the feed of the grain will not be too rapid, but the grain kernels will have an opportunity to churn about in the spaces intervening the ribs *f* and *q*, and in this way assuring the proper cleaning of the surface of the kernels.

A ball-bearing end-thrust is provided at *i*, the construction of which is of the convention form.

The standards *b* are provided with brackets *l* having portions *j* against which the end thrust *i* bears. The case is made of two cylindrical half-parts provided with flanges *n* and secured together by bolts *o*. The ends of the case sections are closed by caps *p*, also for convenience made in two parts, the lower of which are rigidly mounted on the brackets *l*. Plates *h* serve to close the crevices between the abutting faces of the two parts of the case. The interior faces of the case sections *m* are provided with ribs *q*, spaced equi-distant from each other so as to leave room for the material to pass between them, and these ribs are arranged in planes at right angles to the axis of rotation of the cylinder *e*. The oblique ribs *f* of the cylinder *e* are so positioned that one surface thereof will pass the opposed face of the related ribs *q* of the case a distance equal to the width of the kernel of grain; the idea being to prevent any crushing of the kernels.

A suitable driving force is applied to the right end of the shaft *d*. The rotation of the cylinder *e*, as mentioned, forces the grain toward the outlet *r* of the case *m*. And in being moved toward such outlet, the kernels of grain are ground against each other with sufficient frictional contact to strip the outside fiber yet leaving the kernel itself intact.

The grain is introduced into the casing *m* through a hopper *s*, and for the purpose of softening the shells of the hard grains, a pipe *t* is provided, through which water or steam may be admitted into the casing *m*.

The case is provided at the middle with a hopper *u*, the opening of which permits the observation of the operation of my machine. But its principal purpose is to prevent the clogging of my scourer, since if the grain packs too much it will relieve itself by working into this hopper.

I claim:

1. A scouring machine comprising an elongate case, a coaxial cylinder having relative rotation in the case, the interior of the case and the periphery of the cylinder being provided with coöperating series of ribs having extended flat surfaces, the ribs of one series being disposed substantially at right angles to the axis of rotation, the ribs of the other series being arranged diagonally to said axis, and said ribs being so relatively arranged that when the rotatable element is rotated the edges of the ribs thereof will pass the opposed edges of the ribs of the stationary element by a distance equal to the thickness of a kernel of grain.

2. A scouring machine comprising an elongate case, a coaxial cylinder having relative rotation in the case, the interior of the case and the periphery of the cylinder being provided with coöperating series of ribs having extended flat surfaces, the ribs of the case being disposed substantially at right angles to the axis of rotation, the ribs of the cylinder being arranged diagonally to said axis, and said ribs being so relatively arranged that when the rotatable element is rotated the edges of the ribs thereof will pass the opposed edges of the ribs of the stationary element by a distance equal to the thickness of a kernel of grain.

3. A scouring machine comprising an elongate case, a coaxial cylinder having relative rotation in the case, the interior of the case and the periphery of the cylinder being provided with coöperating series of ribs having extended flat surfaces, the ribs of one series being disposed substantially at right angles to the axis of rotation, the ribs of the other series being arranged diagonally to said axis, said ribs being so relatively arranged that when the rotatable element is rotated the edges of the ribs thereof will pass the opposed edges of the ribs of the stationary element by a distance equal to the thickness of a kernel of grain, and the case being provided at the top with a hopper into which the densely packed grain may work and thereby relieve any tendency of clogging.

HENRY ALBERS.

Copies of this patent may be obtained for five cents each, by addressing the "Commissioner of Patents, Washington, D. C."